(No Model.)
D. E. SAGE & J. M. BURNAP.
CREAM TESTING CHURN.
No. 370,822. Patented Oct. 4, 1887.
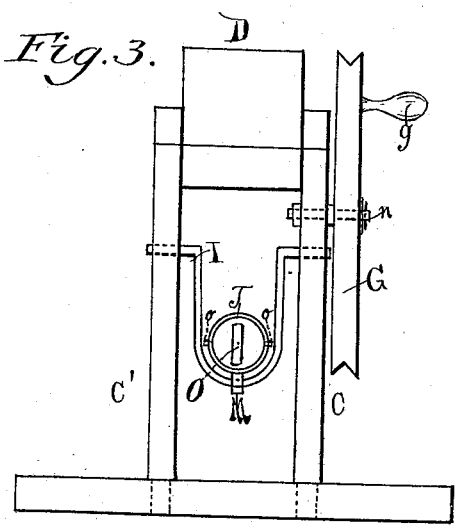
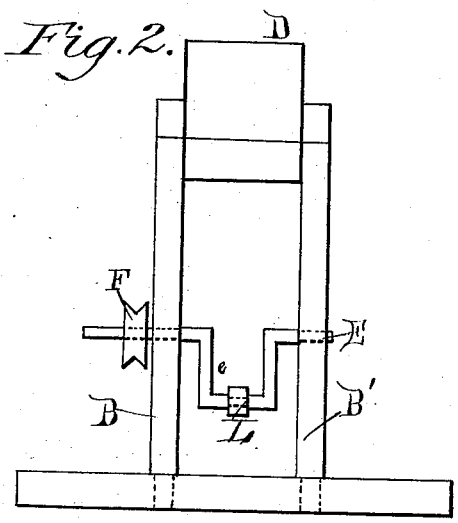
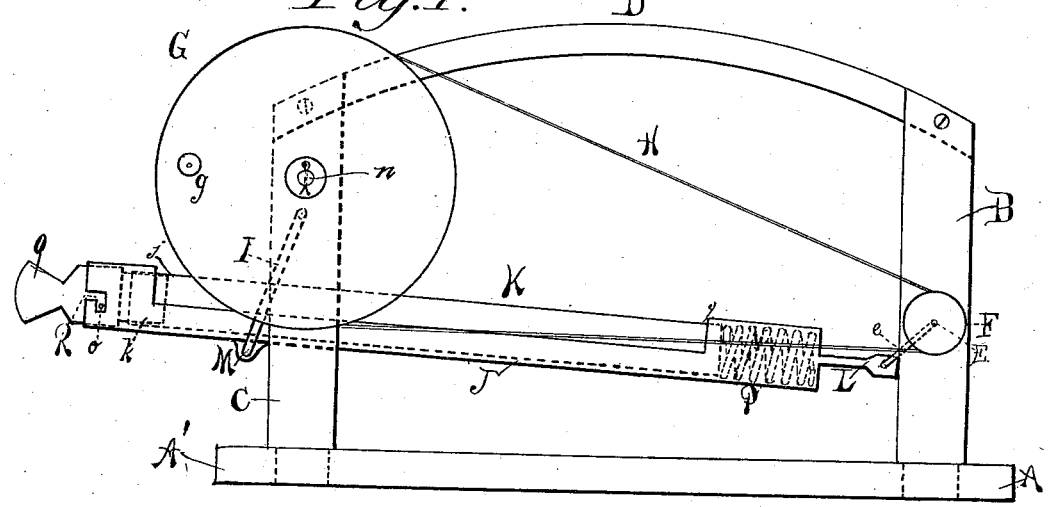

UNITED STATES PATENT OFFICE.

DAVID E. SAGE AND JAMES M. BURNAP, OF FORREST, ILLINOIS.

CREAM-TESTING CHURN.

SPECIFICATION forming part of Letters Patent No. 370,822, dated October 4, 1887.

Application filed November 15, 1886. Serial No. 218,887. (No model.)

*To all whom it may concern:*

Be it known that we, DAVID E. SAGE and JAMES M. BURNAP, citizens of the United States, residing at Forrest, in the county of Livingston and State of Illinois, have invented a new and useful Cream-Testing Churn, of which the following is a specification.

Our invention relates to that class of churns in which a sample of milk or cream is churned and tested to ascertain the amount of butter contained in all the milk or cream from which the sample is taken.

It is more particularly designed for churning a single sample at a time.

The objects of our invention are, first, to provide a simple, cheap, and efficient device with which a dairyman may ascertain the actual amount of butter in the milk or cream he sends to a butter-factory, and to thus verify or correct the values credited to him at the factory; and, second, in churns of the class described, to secure a more thorough and complete agitation of the sample, thereby reducing the time and labor required for the test.

We attain the first of these objects by constructing a churn of small dimensions, few and inexpensive parts adapted to be driven by hand-power, and in which a single test-tube or similar vessel containing the sample is acted upon. The second object is attained by uniting to the simple reciprocating motion in a horizontal plane heretofore imparted to the testing-vessels a vertical reciprocating motion, as is hereinafter described.

The mechanism by which we attain these objects is illustrated in the accompanying drawings, in which—

Figure 1 is a front elevation of the entire machine. Fig. 2 is an elevation of one end, and Fig. 3 a like view of the opposite end, of the machine.

Similar letters refer to similar parts throughout the several views.

The base A A', uprights B B' C C', and crossbar D constitute the frame-work of the machine.

The crank-shaft E rotates in bearings upon the uprights B and B', one end of the shaft extending beyond its bearings to receive the pulley F. A balance-wheel may also be mounted upon the projecting end of said shaft.

A band-wheel, G, turning upon a stud, $n$, which projects from the upright C, is turned by the crank-pin or handle $g$, and transmits rotary motion to pulley F by means of the band H.

A vibrating stirrup, I, is bent to the form shown in Fig. 3, and its extremities are secured in bearings upon uprights C and C'.

A cylindrical carrier or tube-holder, J, is adapted to receive the test-tube K, containing the sample. The upper side of the carrier is open throughout a part of its length to permit the tube K to be seen, as shown at $j\,j$, Fig. 1. One end of the carrier is closed and formed into a stem, L, and the stem is provided with a bearing near its end to receive the crank $e$ on shaft E. On the under side of the carrier is secured the lug M, in which are bearings through which the pendent middle portion of stirrup I passes. The test-tube K, containing the sample and closed by a cork, $k$, is inserted into the open end of the carrier J, and the carrier is closed by the stopper O. A spiral spring, P, within the carrier J presses the tube toward the open end of the carrier, keeping the cork at the end of the tube in contact with stopper O. This construction confines the tube K in its place and prevents displacement of the cork at the end of the tube. The stopper O is kept in place by two projecting pins, $o$ and $o$, which engage in two angled slots at the open end of carrier J. The angular form of the slots is shown in Fig. 1, in which R is one of the slots and $o$ one of the pins on stopper O, showing the position of the pin relatively to the angle in the slot.

The rotation of crank-shaft E imparts a horizontal reciprocating motion to the carrier J, and also a vertical reciprocating motion to the closed end of the carrier. To secure a similar vertical movement of the opposite end of the carrier it is necessary to place the bearing in lug M at a distance from the end of the carrier, as shown in Fig. 1. By this construction the rapid rotation of crank $e$ causes a vigorous longitudinal reciprocation of tube K, accompanied by an alternate elevation and depression of the ends of the tube in circular arcs around the bearings in lug M. As the vertical movement of the ends of the tube is in opposite directions, the tube will at times lie wholly in a horizontal plane, and at other times it will be in inclined positions, the end adjacent to the stopper O becoming alternately the highest and then the lowest part of the tube. This combined horizontal and vertical movement causes a more vigorous agitation of the sample and reduces it to the desired condition much sooner than when moving in a horizontal plane only; but the principal advantage obtained by agitating the sample in this peculiar manner is, that it prevents certain portions of the sample from collecting and remaining in an unchanged condition at the ends of the tube. When longitudinal reciprocation only is imparted to the tube, the first-formed particles of butter collect at the ends of the tube, where they become partially impacted and prevent the free agitation of the remaining fluid portions. This not only retards the process of churning, but portions of the cream or milk confined at the ends of the tube by the partially-impacted masses of butter will not be affected by subsequent agitation. So in the use of cream-testing churns as heretofore constructed two agitations are necessary, the first to be followed by a heating of the sample-vessel and its contents to melt the butter already formed. Then the second agitation, if begun while the sample is warm and continued until it is cold, may so far complete the process of churning that a measurement of the oil found in the tube after a second heating will supply data for estimating the ratio of butter in the sample; but if each end of the tube be reciprocated in a vertical as well as a horizontal direction the particles of butter will remain suspended in the fluid portions of the sample at all times, permitting a free movement of all portions of the contents of the tube, allowing a complete separation of the butter by a single churning.

When the process of churning is completed by our churn, the sample is subjected to heat and the amount of oil is measured, as is customary when using other churns of this class. The sample may also be subjected to a heating process before the churning is completed, if the operator prefers; but this is by no means necessary for a complete reduction of the milk or cream to the desired condition.

The carrier J may be formed with two or more elongated chambers for containing sample-vessels, and for the use of butter-factories the carrier may be so changed as to receive a large number of sample-vessels and still retain the distinctive characteristic of moving in a combined horizontal and vertical direction.

We do not limit ourselves to any details of construction as here shown, for the framing of the machine, as well as the form of its working parts, may be modified in many ways.

What we claim as new, and desire to secure by Letters Patent, is—

In combination with the supporting-frame, the crank-shaft E, journaled therein, the carrier J, having its upper side cut away, one end closed and provided with a stem, L, connected with the crank-shaft, and the other end open, the test-tube K, secured in the carrier, as described, the swinging stirrup I, connected to the under side of the carrier, and mechanism for operating the crank-shaft, substantially as described.

DAVID E. SAGE.
JAMES M. BURNAP.

Witnesses:
JOHN WM. VEATCH,
MARGARET DIMMICK.